United States Patent [19]

Wright

[11] Patent Number: 5,482,657

[45] Date of Patent: Jan. 9, 1996

[54] HEATER ATTACHMENT FOR EVAPORATIVE COOLER

[75] Inventor: Peter S. Wright, St. Marys, Australia

[73] Assignee: F F Seeley Nominees Pty Ltd., St. Marys, Australia

[21] Appl. No.: 335,737

[22] PCT Filed: Mar. 11, 1994

[86] PCT No.: PCT/AU94/00123

§ 371 Date: Mar. 10, 1995

§ 102(e) Date: Mar. 10, 1995

[87] PCT Pub. No.: WO94/20797

PCT Pub. Date: Sep. 15, 1994

[30] Foreign Application Priority Data

Mar. 12, 1993 [AU] Australia ................................ PL7801

[51] Int. Cl.⁶ .................................................. B01F 3/04
[52] U.S. Cl. ........................... 261/142; 392/368; 392/403
[58] Field of Search ........................... 261/142; 392/368, 392/374, 365, 394, 403

[56] References Cited

U.S. PATENT DOCUMENTS 1,982,465  11/1934  Crafton .
2,014,773   9/1935  Matteson ................. 261/142
2,041,897   5/1936  Benson ................... 392/368
2,149,689   3/1939  Smith et al. ............. 392/368
2,588,736   3/1952  Lipton ................... 261/142
2,866,073  12/1958  Omahundro ............... 392/368
4,401,013   8/1983  Ohashi et al. .

FOREIGN PATENT DOCUMENTS 114484  1/1942  Australia .
646789  8/1937  Germany .
3915932 11/1990  Germany .

*Primary Examiner*—Tim R. Miles
*Attorney, Agent, or Firm*—Watts, Hoffmann, Fisher & Heinke

[57] ABSTRACT

A heater attachment for an evaporative cooler having an axial airflow fan (10), in which the airflow is divided by an element mount (18) into an inner airflow in alignment with the hub area of the fan, and an outer airflow surrounding the inner airflow. The element mount (18) has an annular bearing wall with bearing surface, and finger sets (19) rotate on the bearing surface to function as shutters to obstruct the outer airflow when element (32) is energized, and by reducing total airflow, the heated inner airflow is at a higher, more comfortable temperature.

8 Claims, 3 Drawing Sheets ized and by reducing total air flow, the heated inner air
HEATER ATTACHMENT FOR EVAPORATIVE COOLER This application is a 371 of PCT/AU94/00123 Mar. 11, 1994.

This invention relates to improvements in an evaporative cooler of the axial flow type, whereby a heater attachment can supply slow moving air heated to a comfortable temperature.

BACKGROUND OF THE INVENTION

Attempts have been made previously to attach heating elements to evaporative coolers so that a cold occupied space can be heated, but a difficulty is encountered in that the temperature rise is very small because of the large amount of air which passes over the heating elements, and although the occupied space temperature will gradually increase, the fast moving air in passing over the human body will not give the illusion of warming the body, since it is essentially colder than the body heat and the velocity is a significant factor in cooling of the body. For that reason the previous attempts known to have been made by the applicant have been generally regarded as unsuccessful, and this invention is directed to providing a means whereby a reduced velocity of warmer air can be introduced over a heating element in a device normally used for evaporative cooling.

One of the characteristics of a cooler fan of the axial flow type is that there is much less air flowing from the hub area of the fan than from the outer flow in the annulus which surrounds the hub, and this invention seeks to take advantage of that characteristic.

Thus in one embodiment of this invention a heating element is inserted in the space downstream of a fan of a cooler and in an inner air flow from the hub area of the fan, and there is provided means to obstruct the annulus surrounding the hub area.

BRIEF SUMMARY OF THE INVENTION

In this invention, air from an axial flow fan in an evaporative cooler is divided by an element mount into an inner air flow in alignment with the hub area of the fan, and an outer air flow surrounding the inner air flow. The element mount is an annular bearing wall having an outer bearing surface, and finger sets rotate on the bearing surface to function as shutters to obstruct the outer air flow when the element is energised, and by reducing total air flow, the heated inner air flow is at a higher, more comfortable temperature.

BRIEF DESCRIPTION OF THE DRAWINGS

An embodiment is described hereunder with reference to and is illustrated in the accompanying drawings in which.

Figure 2:
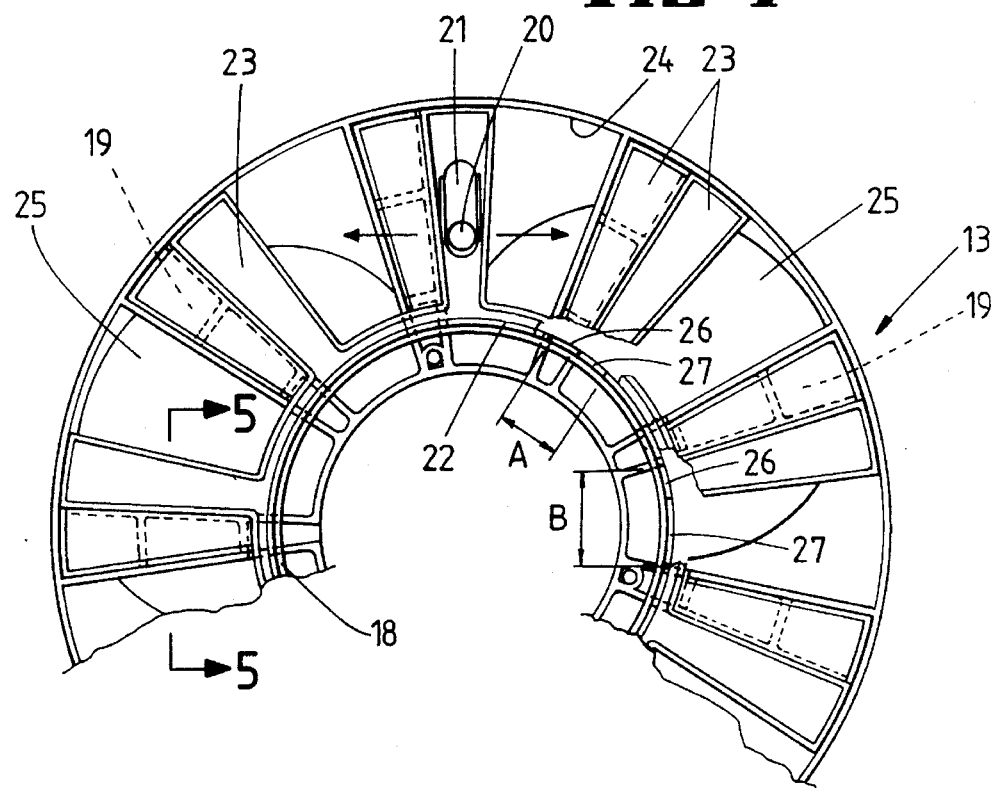
FIG. 2 is a fragmentary sketch drawn to a larger scale than FIG. 1 and showing the shutter means which obstructs an outer air flow which surrounds the hub area.
Figure 3:
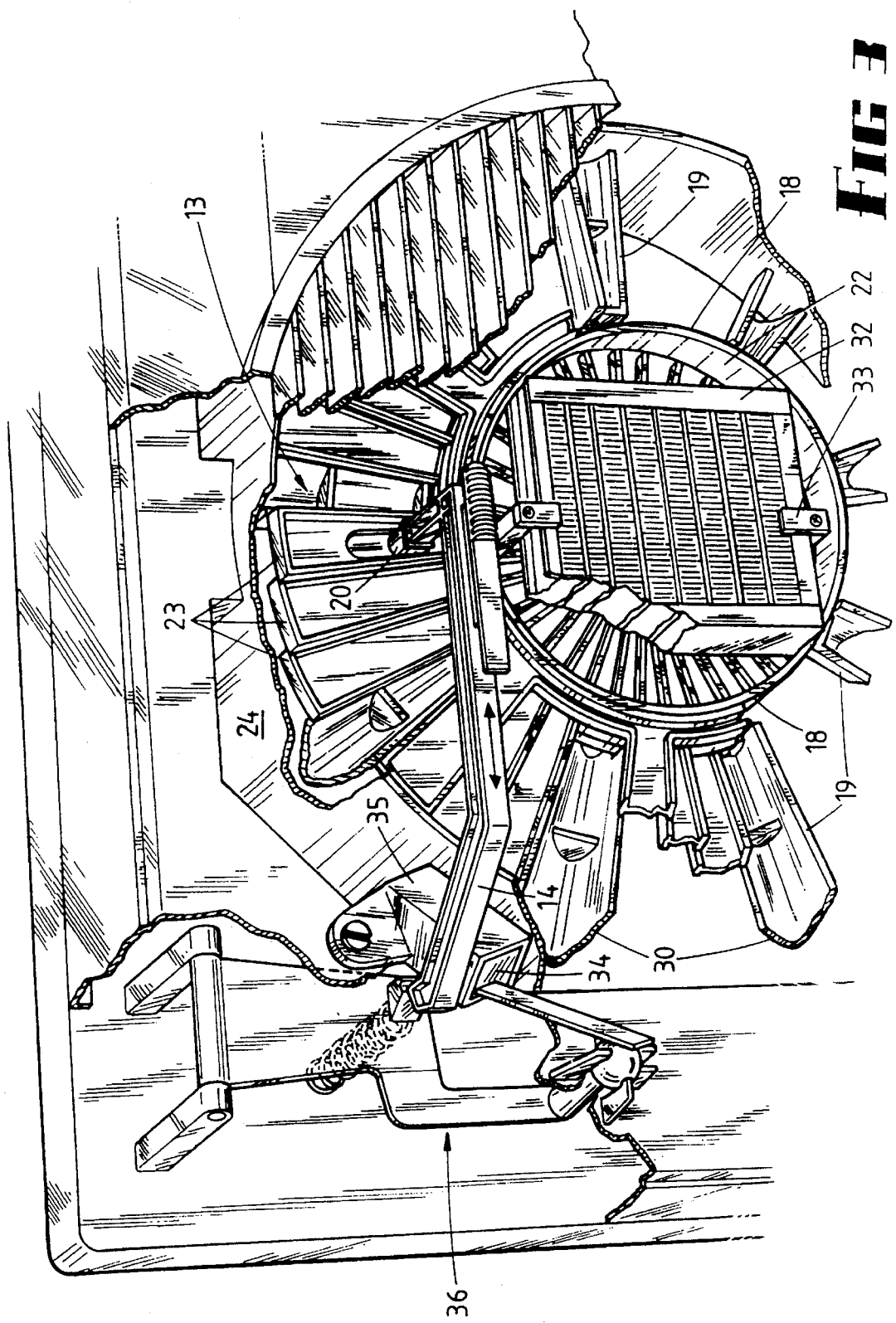
FIG. 3 is a fragmentary perspective view showing details of the heater attachment.
Figure 4:
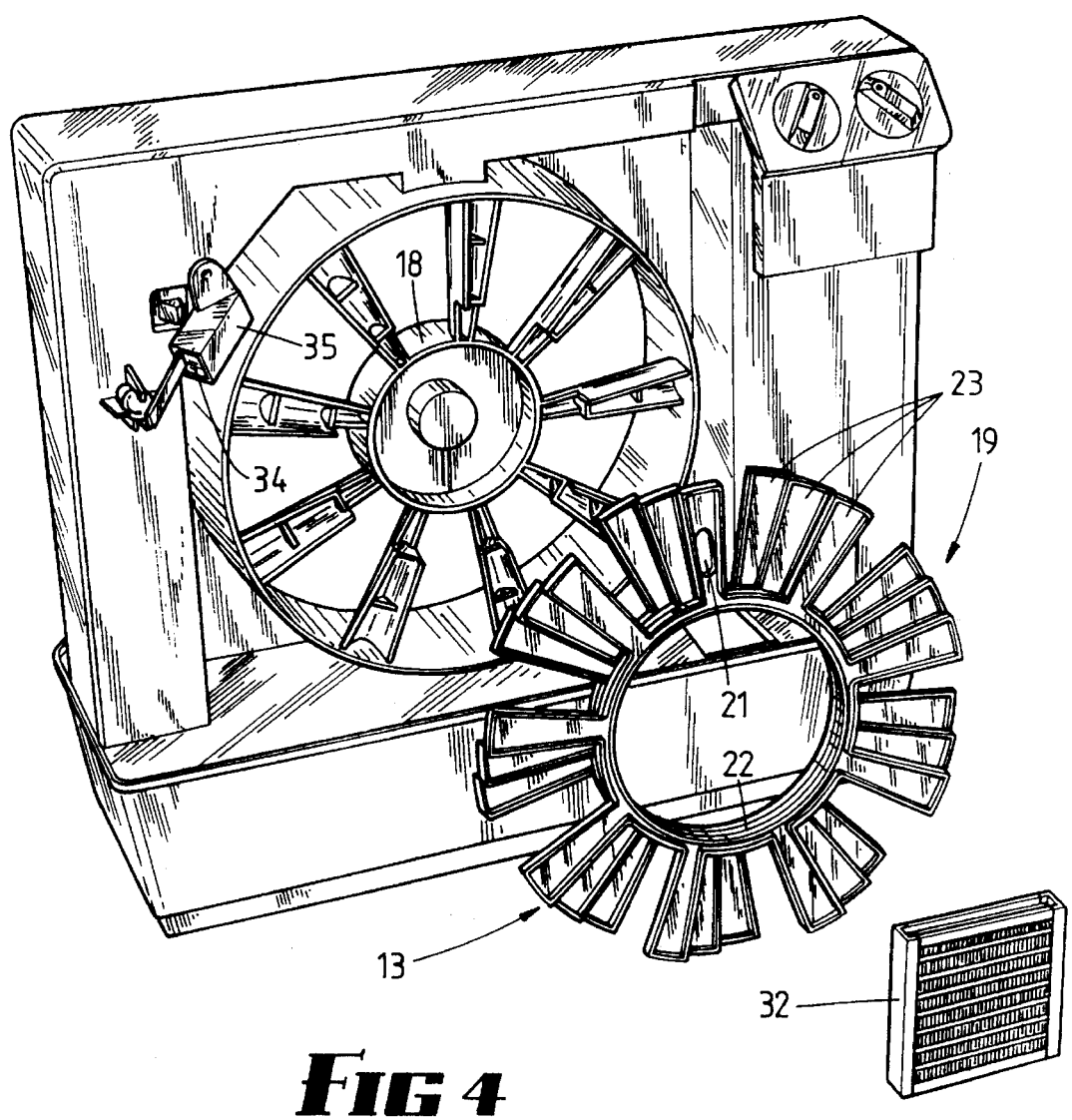
FIG. 4 is an "exploded" view of a rear portion of a cooler, the shutter arrangement, and the element.

In this embodiment an evaporative cooler has a fan of the axial flow type with a hub area 11 separated from the annulus 12 which surrounds it, and as shown in FIG. 2 there is provided a shutter arrangement 13 in the annulus 12 which can be opened or closed by a control member, comprising a slide 14 movable between ribs along the front of the cooler.

The shutter arrangement 13 comprises a central annular bearing wall 18 on which each of three radial finger sets 19 can freely rotate, and rotation is effected by means of a rearwardly directed circular projection 20 carried by the slide 14 which engages the walls of a groove 21 in the outermost of the three finger sets 19, to cause its rotation. Each finger set 19 has a central hub portion 22 which bears against the circular bearing wall 18, and a plurality of radially extending fingers 23 extend outwardly from the central hub portion 22 and lie contiguous with a circular shroud 24 which extends forwardly from fan blades 10 of a fan and motor assembly. Each of the two outermost finger sets 19 is provided with a respective rearwardly extending projection 26 and this engages a short circumferential slot 27 in the hub portion 22 of the adjacent and rearward finger set 19 (FIG. 2). As shown also in FIG. 2, the intermediate finger set 19 has a slot of dimension A and the rearmost slot of dimension B which exceeds dimension A, the arrangement being such that when the outermost finger set is first moved by sliding the slide 14 to the right as shown in FIG. 1, firstly the outmost finger set moves through an angle of 10° before projection 26 traverses the distance A and commences movement of the intermediate finger set 19 and that in turn will move a further 10° before the intermediate finger set traverses the dimension B to commence movement of the innermost finger set 19, so that the slide A effects sequential movement of the three finger sets 19.

Figure 5:
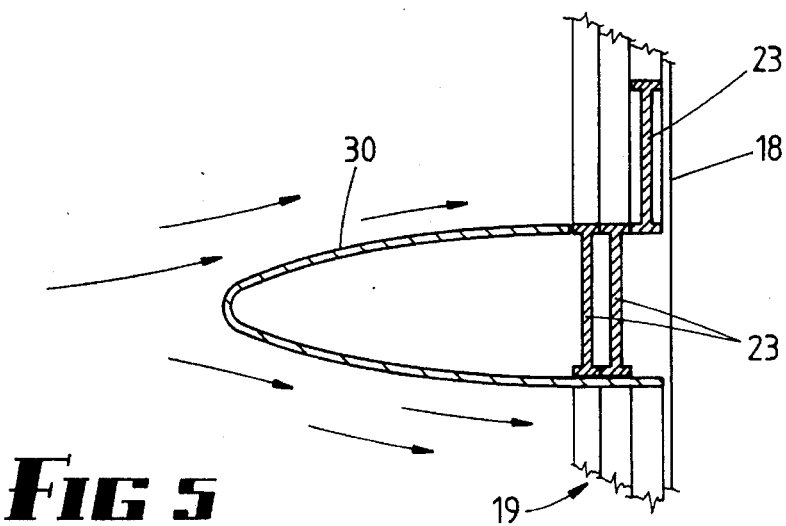
FIG. 5 is a section taken on line 5—5 of FIG. 2 but drawn to a larger scale.

An inherent problem with the finger set is that its struts intercept the annulus area and thereby reduces air flow. In order to reduce excessive obstruction of air flow through the annulus 12, there is provided an upstream aerofoil portion of struts 30, which cover all of the fingers 23 when the slide is located at its extreme left (FIG. 5). With this improvement only a very small loss of air flow is experienced from the fan when the device is in its cooling mode. However, the aerofoil struts 30 combine with the fingers 23 to completely blanket the annulus 12 and thereby all the air which is discharged from the device 10 except the inner air flow which passes through the hub area. However, this is essentially very much reduced.

Figure 1:
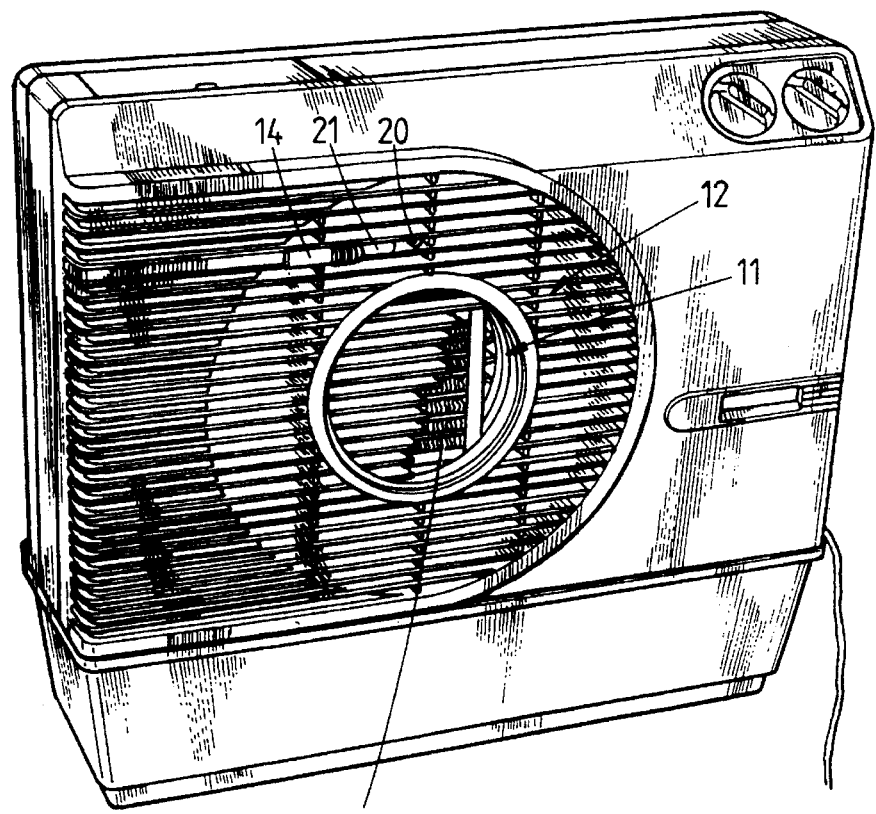
FIG. 1 is a front view of a cooler incorporating the heater attachment of this invention.

As seen in FIG. 1, the hub area 11 contains an element 32 secured to the annular wall 18 by fasteners 33, the wall 18 being the element mounting means. Element 32 can be switched on also by action of the slide functioning via a mechanism 36 with a switch 34, contained within a housing 35, so that when the slide is moved to the right the element is energised. Desirably the element 32 is of the ceramic type which will reduce power consumption if for any reason the fan ceases to be operative. In occupying a comparatively low air flow zone, the element 32 does not interfere greatly with efficiency in the cooling mode.

A consideration of the above embodiment will indicate that the invention is simple but nevertheless results in an effective heating attachment which is associated with low air movement, and thereby not only does a person feel warmer air but also air moving at slower velocity so that the effect of the invention is to provide comfort for a person while an occupied space in which he is located reaches a comfortable temperature.

I claim:

1. Improvements in an evaporative cooler of the type having a motor and an axial flow fan assembly with fan blades radiating from a central hub, comprising securing means securing element mounting means in axial alignment with, and downstream of, said hub, an electrical heating element carried by the mounting means, said heating element having passages for substantially unobstructed inner through-flow of air from an inner area of said fan adjacent said hub, shutter means also downstream of said blades, and shutter control means coupled to said shutter means between an open and closed positions whereby an outer flow of air from an outer area of said fan surrounding said inner area is respectively unobstructed, and obstructed.

2. Improvements according to claim 1 wherein said element mounting means comprises a wall which divides said inner air flow from said outer air flow.

3. Improvements according to claim 1 further comprising a switch in a power circuit of said electrical heating element, and a surface on said shutter control means which so co-operates with said switch as to effect energising of said element only when said shutters are closed.

4. Improvements according to claim 1 further comprising a circular fan shroud surrounding said fan blades, said element mounting means having an annular bearing wall co-axial with, and of smaller diameter than, said shroud, said securing means comprising a plurality of struts extending outwardly from said annular wall and joining said annular wall to said shroud.

said shutter means comprising at least one finger set carried by said annular wall and having a plurality of shutter fingers extending outwardly from said annular wall, and movable between said open position wherein said fingers are in axial alignment with said struts, and a closed position wherein said fingers are between said struts, and co-operate with said struts to obstruct said outer air flow.

5. Improvements according to claim 4 wherein an outer surface of said annular wall comprises a bearing surface, and a plurality of said finger sets each having a hub portion rotatable on said wall, the outer ends of said fingers being contiguous with an inner surface of said shroud at its downstream end.

6. Improvements according to claim 4 further comprising a plurality of said finger sets each having a hub rotatable about said annular wall, said fingers extending outwardly from said hub, the first of a pair of adjacent said hubs having surfaces defining a circumferential slot, and another of said hubs having an extending projection which is movable within a said slot and engageable against an end thereof, the slot length being such that rotation of said other of hubs between said open and closed positions also controls rotation of said first of said hubs.

7. Improvements according to claim 4 wherein each said strut has an upstream aerofoil portion.

8. Improvements according to claim 4 wherein said shutter control means comprises a movable control member, a said finger set comprises surfaces in a finger thereof defining a slot, and said control member has a projection thereon engaging said finger slot to cause partial rotation of said finger set upon movement of said control member.

* * * * *